US010008948B1

(12) United States Patent
Strijker

(10) Patent No.: US 10,008,948 B1
(45) Date of Patent: Jun. 26, 2018

(54) ACTIVE CLAMP CIRCUIT FOR SWITCHED MODE POWER SUPPLIES

(71) Applicant: NXP B.V., Eindhoven (NL)

(72) Inventor: Joan Wichard Strijker, Wijchen (NL)

(73) Assignee: NXP B.V., Eindhoven (NL)

( * ) Notice: Subject to any disclaimer, the term of this patent is extended or adjusted under 35 U.S.C. 154(b) by 0 days. days.

(21) Appl. No.: 15/390,622

(22) Filed: Dec. 26, 2016

(51) Int. Cl.
*H02M 3/335* (2006.01)
*H02M 1/34* (2007.01)

(52) U.S. Cl.
CPC ......... *H02M 3/33592* (2013.01); *H02M 1/34* (2013.01); *H02M 2001/342* (2013.01)

(58) Field of Classification Search
CPC .......... H02M 2001/0048; H02M 1/34; H02M 2001/342; H02M 3/335; H02M 3/33569; H02M 3/33592
See application file for complete search history.

(56) References Cited

U.S. PATENT DOCUMENTS

| 6,249,444 | B1* | 6/2001 | Cross | H02M 3/33569 363/131 |
| 6,369,525 | B1 | 4/2002 | Chang et al. | |
| 7,606,051 | B1 | 10/2009 | Wittenbreder, Jr. | |
| 2009/0257255 | A1 | 10/2009 | Zhang | |
| 2011/0194313 | A1* | 8/2011 | Yoshinaga | H02M 3/33569 363/21.12 |
| 2012/0212981 | A1* | 8/2012 | Lin | H02M 3/33507 363/21.15 |
| 2014/0247627 | A1* | 9/2014 | Louvel | H02M 3/33592 363/21.03 |
| 2014/0369093 | A1* | 12/2014 | Park | H02M 1/34 363/50 |
| 2015/0003121 | A1* | 1/2015 | Yang | H02M 3/33523 363/21.17 |
| 2015/0124499 | A1* | 5/2015 | Eum | H02M 3/335 363/50 |
| 2016/0276923 | A1* | 9/2016 | Hayakawa | H02M 1/34 |
| 2017/0048937 | A1* | 2/2017 | Wang | H01F 38/14 |
| 2017/0054375 | A1* | 2/2017 | Phadke | H02M 3/33569 |

FOREIGN PATENT DOCUMENTS

EP 2 259 414 A1 12/2010

* cited by examiner

*Primary Examiner* — Fred E Finch, III

(57) ABSTRACT

Switched mode power supply (SMPS) with at least one active clamp circuit and method of operating such a SMPS are described. The active claim circuit utilizes a clamp switch, a Zener diode and a clamp capacitor that are connected in series between one side of a particular winding of a transformer and the other side of the particular winding of the transformer.

18 Claims, 5 Drawing Sheets

ACTIVE CLAMP CIRCUIT FOR SWITCHED MODE POWER SUPPLIES

Embodiments of the invention relate generally to active clamp circuits and, more particularly, to active clamp circuits for flyback switched mode power supplies.

Flyback switched mode power supplies are widely used to convert power from a source, such as mains power, to DC power supply for electronic devices, such as cellphones and tablets. Flyback switched mode power supplies use a transformer as the storage inductor, which provides isolation as well as the ability to adjust the output voltage. However, due to its operation, a flyback switched mode power supply may suffer losses due to leakage inductance.

A well-known method to reduce these losses is add an active clamp circuit to the flyback switched mode power supplies. However, some known active clamp circuits require an integrated circuit (IC) to drive the clamp circuits. Other known active clamp circuits are self-driven, but are active during the full secondary stroke and intended for transition mode (quasi resonant) only power converters, which make these clamp circuits less suitable for Discontinuous Conduction Mode (DCM) operation.

SUMMARY

Switched mode power supply (SMPS) with at least one active clamp circuit and method of operating such a SMPS are described. The active claim circuit utilizes a clamp switch, a Zener diode and a clamp capacitor that are connected in series between one side of a particular winding of a transformer and the other side of the particular winding of the transformer.

In an embodiment, a SMPS includes a transformer with a first winding and a second winding, the first winding being connected to a power source node and the second winding connected to an output node, an input switch connected to the first winding of the transformer, an output switch connected to the second winding of the transformer, and an active clamp circuit connected to the transformer. The active clamp circuit includes a clamp switch, a Zener diode and a clamp capacitor connected in series between one side of a particular winding of the transformer and the other side of the particular winding of the transformer, the particular winding being one of the first and second windings of the transformer.

In an embodiment, the Zener diode is connected between the clamp switched and the clamp capacitor.

In an embodiment, the clamp switch is a transistor and the active clamp circuit further includes a resistor connected to a control node of the transistor and the Zener diode and a diode connected to the control node of the transistor and the clamp capacitor.

In an embodiment, the clamp switch is a metal-oxide-semiconductor field-effect transistor (MOSFET).

In an embodiment, the active clamp circuit further includes a second clamp capacitor connected in parallel with the resistor.

In an embodiment, the active clamp circuit is connected to the first winding of the transformer and the input switch.

In an embodiment, the SMPS further includes a second active clamp circuit connected to the second winding of the transformer and the output switch, the second active clamp circuit including a second clamp switch, a second Zener diode and a second clamp capacitor connected in series between one side of the second winding of the transformer and the other side of the second winding of the transformer.

In an embodiment, the active clamp circuit is connected to the second winding of the transformer and the output switch.

In an embodiment, a method of operating a SMPS includes turning on a primary switch connected to a first winding of a transformer that is connected to a power source node to store energy in the transformer, turning on a secondary switch connected to a second winding of the transformer that is connected to an output node to transfer the stored energy to the output node, and selectively turning on a clamp switch of an active clamp circuit that is connected in series with a Zener diode and a capacitor between one side of a particular winding of the transformer and the other side of the particular winding of the transformer, the particular winding being one of the first and second windings of the transformer.

In an embodiment, the Zener diode is connected between the clamp switch and the clamp capacitor.

In an embodiment, the clamp switch is a transistor and the active clamp circuit further includes a resistor connected to a control node of the transistor and the Zener diode and a diode connected to the control node of the transistor and the clamp capacitor.

In an embodiment, the active clamp circuit further includes a second clamp capacitor connected in parallel with the resistor.

In an embodiment, selectively turning on the clamp switch includes selectively turning on the clamp switch of the active clamp circuit that is connected to the first winding of the transformer and the input switch.

In an embodiment, the method further includes selectively turning on a second clamp switch of a second active clamp circuit that is connected in series with a second Zener diode and a second capacitor between one side of the second winding of the transformer and the other side of the second winding of the transformer.

In an embodiment, selectively turning on the clamp switch includes selectively turning on the clamp switch of the active clamp circuit that is connected to the second winding of the transformer and the input switch.

In an embodiment, a SMPS includes a transformer with a primary winding and a secondary winding, an input capacitor connected to a power source node and the primary winding of the transformer, an input switch connected to the primary winding of the transformer, an output capacitor connected to the secondary winding of the transformer, an output switch connected to the secondary winding of the transformer, and an active clamp circuit connected to the transformer. The active clamp circuit includes a clamp transistor switch, a Zener diode and a clamp capacitor connected in series between one side of a particular winding of the transformer and the other side of the particular winding of the transformer, the particular winding being one of the primary and secondary windings of the transformer, and a resistor and a diode connected in parallel between a control node of the clamp transistor switch and the Zener diode.

In an embodiment, the Zener diode is connected between the clamp transistor switch and the clamp capacitor.

In an embodiment, the active clamp circuit further includes a resistor and a diode, the resistor being connected to a control node of the clamp transistor switch and the Zener diode, the diode being connected to the control node of the clamp transistor switch and the clamp capacitor In an embodiment, the active clamp circuit further includes a second clamp capacitor connected in parallel with the resistor.

In an embodiment, the active clamp circuit is connected to the first winding of the transformer and the input switch, and further comprising a second active clamp circuit connected to the second winding of the transformer and the output switch, the second active clamp circuit including a second clamp switch, a second Zener diode and a second clamp capacitor connected in series between one side of the second winding of the transformer and the other side of the second winding of the transformer.

Other aspects and advantages of embodiments of the present invention will become apparent from the following detailed description, taken in conjunction with the accompanying drawings, depicted by way of example of the principles of the invention.

BRIEF DESCRIPTION OF THE DRAWINGS

Throughout the description, similar reference numbers may be used to identify similar elements.

DETAILED DESCRIPTION

Figure 1:
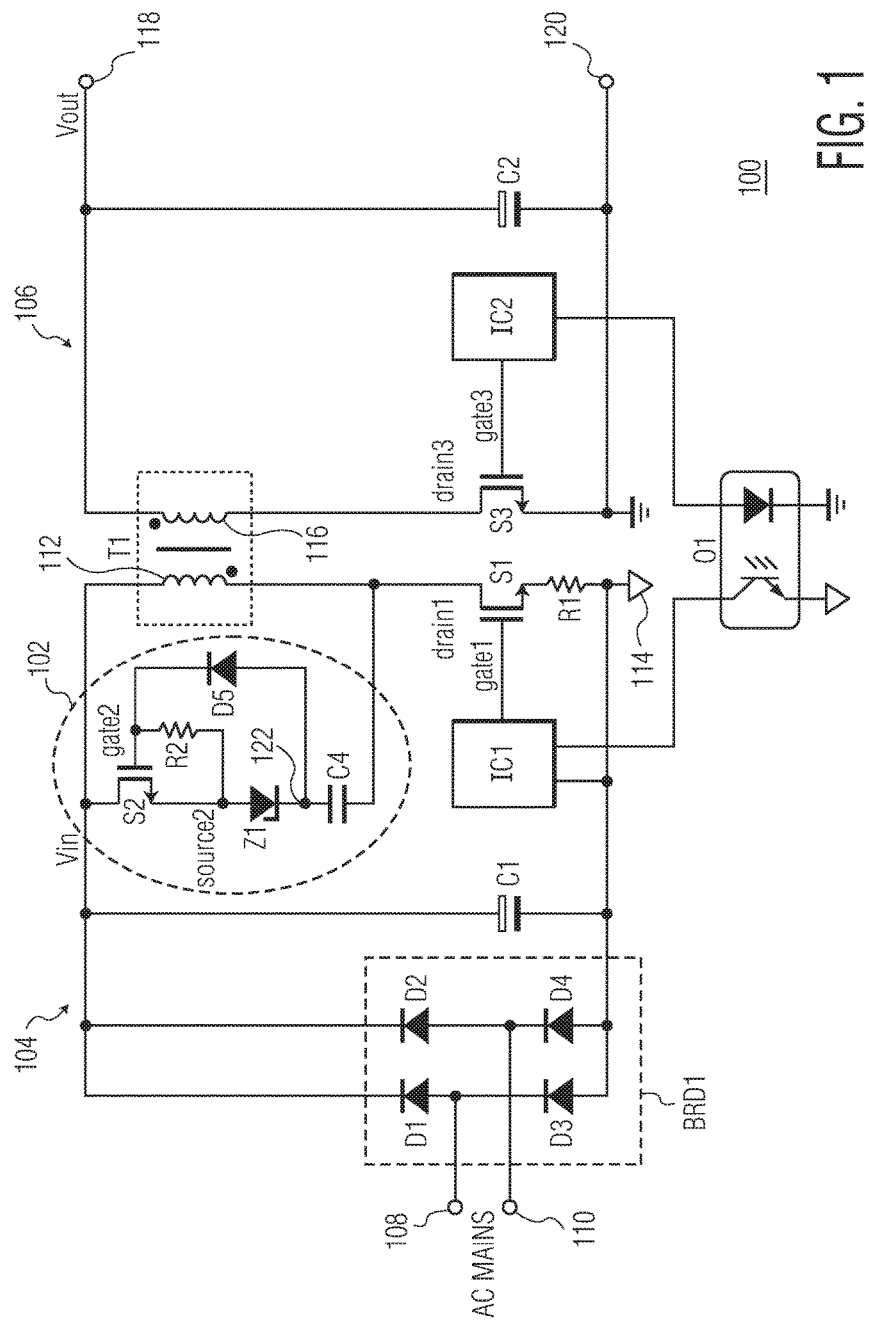
FIG. 1 is a circuit diagram of a SMPS in accordance with a first embodiment of the invention.

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Using one or more clamp circuits in switched mode power supply (SMPS) is a well-known technique to reduce losses due to leakage inductance and limit overshoot. A passive clamp circuit for a flyback-type SMPS is described in U.S. Pat. No. 7,606,051 (FIG. 2 of U.S. Pat. No. 7,606,051 is a passive clamp circuit). However, in order to drive an active clamp circuit, a high voltage shift circuitry is needed, which is typically integrated in a high voltage integrated circuit (IC), adding significant cost to the SMPS and increasing the number of pins required of the controller IC. The fly-back SMPS may further include another active clamp circuit in the secondary or output side of the SMPS. However, with the addition of the second clamp circuit, an internal isolation circuit is needed, which add even more cost to the SMPS.

A self-driven active clamp circuit for a transition mode power converter is described in U.S. Patent Application Publication No. 2009/0257255 A1. However, the self-driven active clamp circuit suffers from significant variations of the gate voltage of the clamp transistor, which is resolved by using an auxiliary winding. However, because the clamp transistor is drive by the auxiliary voltage, this solution is not suitable for Discontinuous Conduction Mode (DCM) operation.

FIG. 1 is a circuit diagram of a SMPS 100 with an active clamp circuit 102 in accordance with a first embodiment of the invention. The SMPS 100 may be used for various power supply applications, such as a power supply for small electronic devices, e.g., cell phones, tablets and laptops. The active clamp circuit 102 of the SMPS 100 is self-driven, and thus, does not require a control IC to drive the active clamp circuit, which lowers the cost for the SMPS. In addition, the active clamp circuit 102 allows the SMPS 100 to run in transition mode operation, as well as in DCM operation.

As shown in FIG. 1, the SMPS 100 includes a primary or input side 104 and a secondary or output side 106 that are isolated from each other via a transformer T1 and an optical coupler O1. In this embodiment, the active clamp circuit 102 is located in the input side 104 of the SMPS 100.

The input side 104 of the SMPS 100 includes a bridge rectifier diode BRD1, an input capacitor C1, a first control circuit IC1, a first switch S1 and a resistor R1. The bridge rectifier diode BRD1 is made up of four diodes D1, D2, D3 and D4, which are connected to AC mains via a pair of input nodes 108 and 110. The bridge rectifier diode BRD1 is connected to the input capacitor C1. Thus, the AC mains is connected to the input capacitor C1 via the bridge rectifier diode BRD1.

The first control circuit IC1 is configured to drive the first switch S1, which can be a transistor with a control terminal (e.g., gate) and conduction terminals (e.g., source and drain) such as a metal-oxide-semiconductor field-effect transistor (MOSFET), as shown in FIG. 1. The MOSFET S1 is connected to the primary winding 112 of the transformer T1 and connected to a common node 114, which may be ground, via the resistor R1. In an embodiment, the first control circuit may be a known integrated circuit (IC) used to control a switch on the input side of a conventional flyback switched mode power supply. As an example, the first control circuit IC may be an IC found in TEA1836 or TEA1755 sold by NXP Semiconductors.

The output side 106 of the SMPS 100 includes an output capacitor C2, a second control circuit IC2 and a second switch S3. The output capacitor C2 is connected to the primary winding 116 of the transformer T1 and ground. The second control circuit IC2 is configured to drive the second switch S3, which can be a transistor with a control terminal (e.g., gate) and conduction terminals (e.g., source and drain). In the illustrated embodiment, the second switch S3 is a synchronous rectifier (SR) MOSFET. The SR MOSFET is connected to the secondary winding of the transformer and connected to ground.

In operation, energy from the input side 104 is transferred to the output capacitor C2 via the transformer T1 using the SR MOSFET S3. The second control circuit IC2 is configured to drive the SR MOSFET S3, and provide feedback to the first control circuit IC1 via the optocoupler O1 to control the output voltage across output nodes 118 and 120. In an embodiment, the second control circuit IC2 may be a known IC used to control a switch in the output side of a conventional flyback switched mode power supply. As an example, the second control circuit IC2 may be an IC found in TEA1791 or TEA1795 sold by NXP Semiconductors.

The active clamp circuit 102 of the SMPS 100 includes a clamp switch S2, a Zener diode Z1, a diode D5, a clamp capacitor C4 and a resistor R2. The clamp switch S2 (which can be a transistor such as a MOSFET), the Zener diode Z1 and the clamp capacitor C4 are connected in series to both sides of the primary winding 112 of the transformer T1. The Zener diode Z1 is oriented so that the anode of the Zener diode is connected to the source of the clamp MOSFET S2 and the cathode of the Zener diode is connected to the clamp capacitor C4. The resistor R2 is connected to the gate of the clamp MOSFET S2 and the source of the clamp MOSFET. The cathode of the diode D5 is connected to the gate of the clamp MOSFET S2 and the anode of the diode D5 is connected to a node 122 between the Zener diode Z1 and the clamp capacitor C4.

The overall operation of the SMPS 100 in accordance with an embodiment is now briefly described. In the primary stroke, the gate of the MOSFET S1 is set high by the first control circuit IC1, which turns on the MOSFET S1. However, the gate of the SR MOSFET S3 is set low by the second control circuit IC2, which turns off the SR MOSFET S3. During the primary stroke, energy is stored in the transformer T1. During the secondary stroke, the gate of the SR MOSFET S3 is set high by the second control circuit IC2, which turns on the SR MOSFET S3. The energy stored in the transformer during the primary stroke is then transferred to the output side 106 during the secondary stroke.

As for the active clamp circuit 102 of the SMPS 100, the clamp MOSFET S2 is driven by a voltage generated by the clamp current running through the Zener diode Z1, which begin to flow at the start of the secondary stroke. This voltage is sent to the gate of the clamp MOSFET S2 via the diode D5, so the clamp MOSFET S2 is turned on at the start of the secondary stroke.

At certain conditions, the clamp MOSFET S2 is turned off via the resistor R2. As soon as the positive slope on the signal on the drain of the MOSFET S1 has ended, the current through the clamp MOSFET S2 will reverse. The diode D5 will then become non-conductive and the gate of the clamp MOSFET S2 will discharge via the resistor R2. The discharge time is defined by the gate capacitance of the clamp MOSFET S2 and the resistor value of the resistor R2. The energy stored in the clamp capacitor C4 at the positive slope of the signal on the drain of the MOSFET S1 is released after the positive slope has ended.

Figure 2:
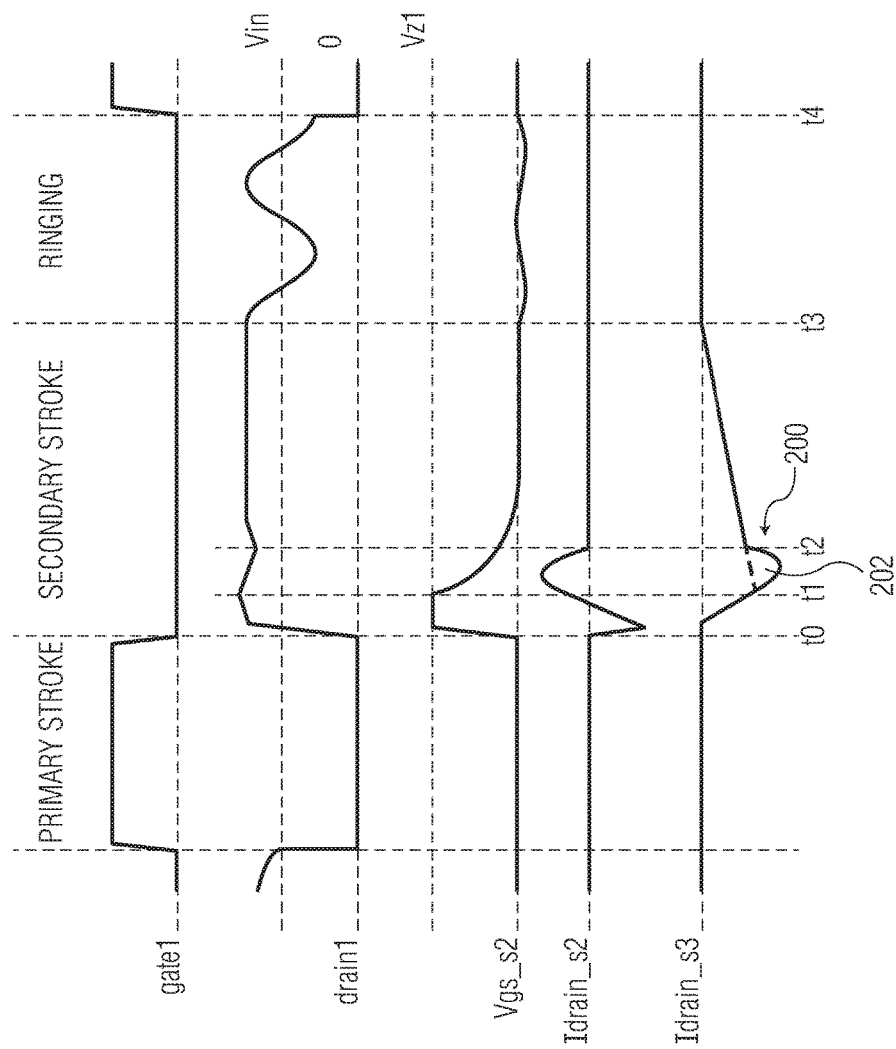
FIG. 2 is a signal diagram of the SMPS depicted in FIG. 1 in accordance with an embodiment of the invention.

A detailed signal diagram for the SMPS 100 with the active clamp circuit 102 in accordance with an embodiment of the invention is shown in FIG. 2. At t=t0, the secondary stroke starts and the positive slope of the signal on the drain (drain1) of the MOSFET S1 creates negative current through the drain (Idrain_S2) of the clamp MOSFET S2. Initially, when the clamp MOSFET S2 is still non-conductive, the current will flow through the back gate diode of the clamp MOSFET (not shown). This current also creates a voltage across the Zener diode (Vzl), which then turns on the clamp MOSFET S2 via the diode D5, as illustrated the gate-source voltage (Vgs_S2) of the clamp MOSFET S2.

At t=t1, the positive slope of the signal on the drain (drain1) of the MOSFET S1 has ended and the current through the drain (1drain_S2) of the clamp MOSFET S2 will reverse. The energy stored in the clamp capacitor C4 during the positive slope of the signal on the drain (drain1) of the MOSFET S1 is now released. The energy flows via the transformer T1 to the output side 106, and thus, the current on the drain (Idrain_S3) of the SR MOSFET S3 shows an inverted hump 200. The area 202 between the dotted line and the solid line is the energy that is recovered from the active clamp circuit 102.

At t=t2, all the energy stored in the clamp capacitor C4 has been transferred and the clamp MOSFET S2 is gradually turned off because the gate current discharges through the resistor R2.

At t=t3, the secondary stroke has ended and in DCM operation, ringing will be present. This ringing will however not turn on the clamp MOSFET S2. The dv/dt of the signal on the drain (drain1) of the MOSFET S1 is typically very small during the ringing period compared to the dv/dt at the start of the secondary stroke. The clamp MOSFET S2 will not be turned on as long as the following condition is satisfied:

$$C4*dv(\text{drain1})/dt*R2 < Vth(S2),$$

where C4 is the capacitance value of the clamp capacitor C4, dv(drain1)/dt is the voltage change on the drain of the MOSFET S1 during the ringing period, R2 is the resistance value of the resistor R2, Vth(S2) is the threshold voltage of the MOSFET S2.

In this embodiment, the active clamp circuit 102 operates to prevent overshoot on the MOSFET S1. As explained above, the active clamp circuit 102 is only active during the start of the secondary stroke, and thus, the active clamp circuit has no effect on the rest of the cycle, which allows the SMPS 100 to not only be run in transition mode operation, but also in DCM operation.

Figure 3:
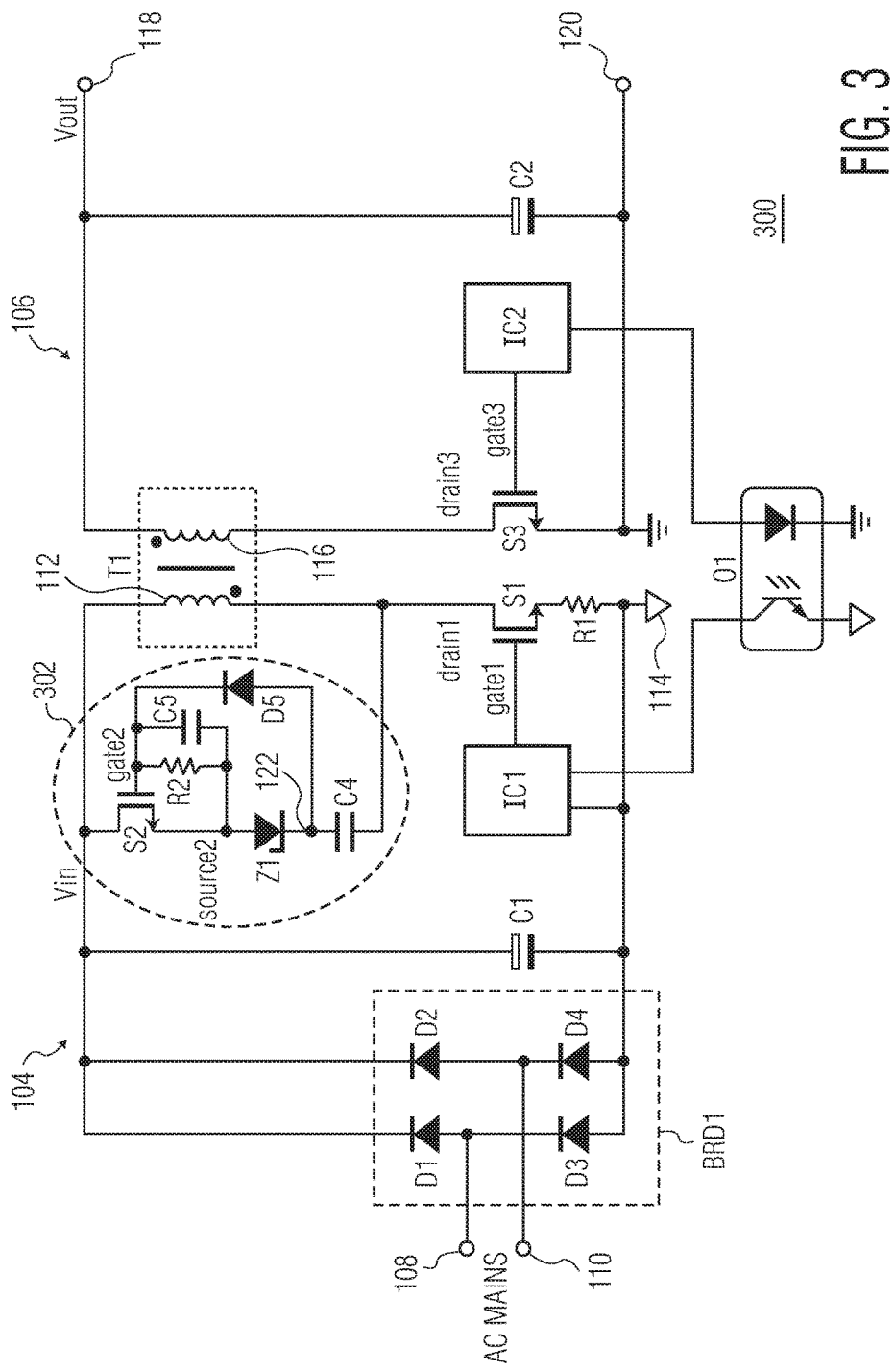
FIG. 3 is a circuit diagram of a SMPS in accordance with a second first embodiment of the invention.

One concern with the active clamp circuit 102 is that gate capacitance of the clamp MOSFET S2 may have significant variations, especially when used in higher power applications. FIG. 3 shows a SMPS 300 with an active clamp circuit 302 in accordance with a second embodiment of the invention that resolve the issue regarding large variations of the gate capacitance of a clamp MOSFET.

As shown in FIG. 3, the SMPS 300 includes all the components of the SMPS depicted in FIG. 1. However, the active clamp circuit 302 of the SMPS 300 includes an additional capacitor C5. Because the voltage on the gate of the clamp MOSFET S2 is set by the Zener voltage Z1, the capacitor C5 can be placed on the gate-source connection. With the added capacitor C5, the value of the resistor R2 needs to be adjusted if the same discharge timing is required.

If the capacitor C5 is significant larger than the gate capacitance of the clamp MOSFET S2, the total capacitance of the gate and the capacitor C5 in parallel will have a small variation even if the gate capacitance has a large variation.

Figure 4:
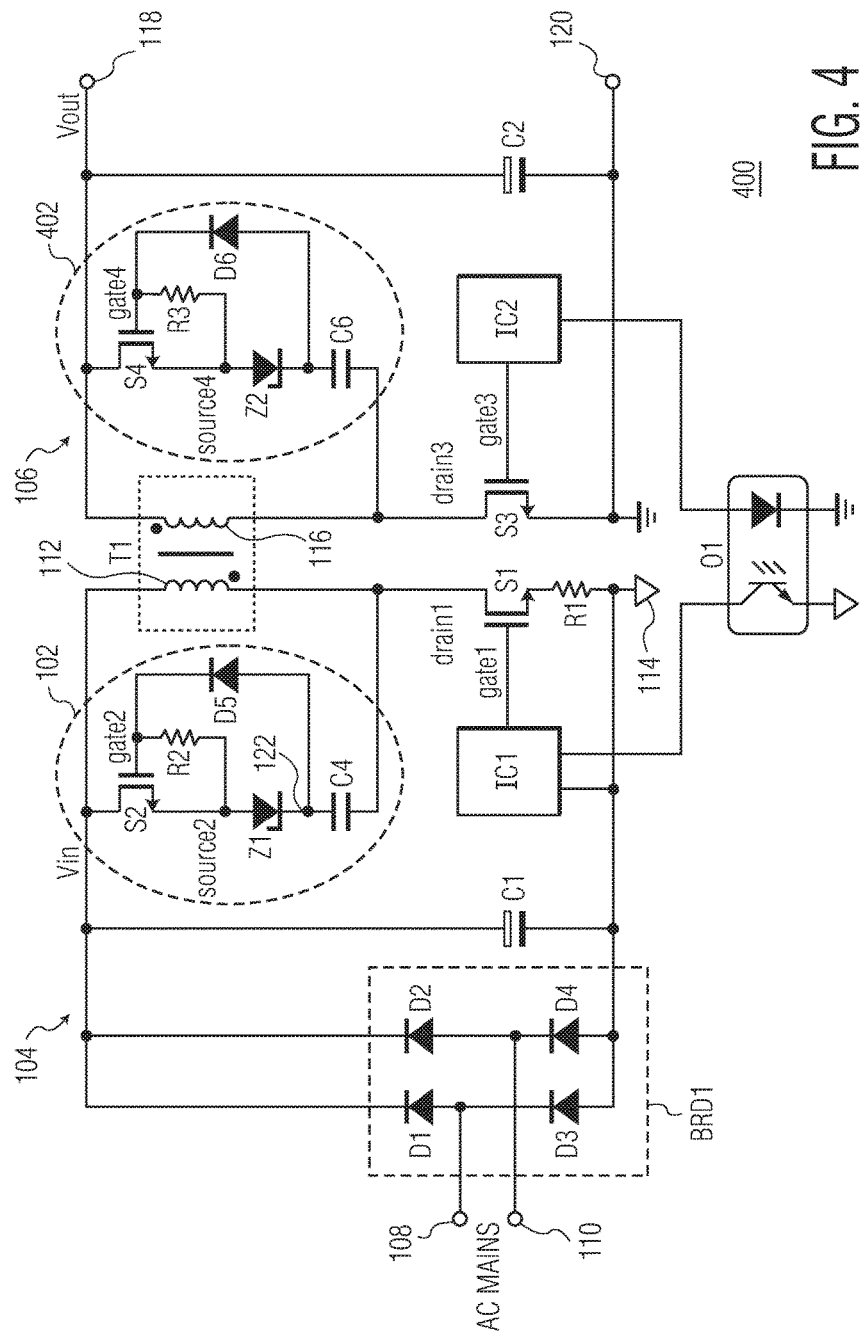
FIG. 4 is a circuit diagram of a SMPS in accordance with a third first embodiment of the invention.

In some embodiments, the active clamp circuit 102 or 302 in accordance with different embodiments of the invention may also be used in the output side of a SMPS. FIG. 4 shows a SMPS 400 in accordance with a third embodiment of the invention that includes an active clamp circuit in the input side, as well as the output side.

As shown in FIG. 4, the SMPS 400 is similar to the SMPS 100 depicted in FIG. 1. The only difference between the two is that the SMPS 400 includes a second active clamp circuit 402 in the output side 106. The second active clamp circuit 402 includes the same components as the active clamp circuit 102 of the SMPS depicted in FIG. 1, which is also included in the input side 104 of the SMPS 400. Thus, the second active clamp circuit 402 includes a clamp switch S4 (shown as MOSFET), a Zener diode Z2, a diode D6, a clamp capacitor C6 and a resistor R3. However, the second active clamp circuit 402 of the SMPS 400 is connected to the transformer T1 such that the drain of the clamp MOSFET S4 is connected to one side of the secondary winding of the transformer and the clamp capacitor C6 is connected to the other side of the secondary winding of the transformer.

The operation of the second active clamp circuit 402 is similar to the operation of the active clam circuit 102 of the SMPS 100, which was previously described. The difference is that the second active clamp circuit 402 clamps the voltage across the SR MOSFET S3 during the primary stroke. The drain source voltage of the SR MOSFET S3 is essentially inverted compared to the drain source voltage of the MOSFET S1. If gate capacitance variation is a concern, one or both of the active clamp circuits 102 and 402 of the SMPS 400 may further include a capacitor connected in parallel to the resistor in the respective active clamp circuit, similar to the active clamp circuit 302 depicted in FIG. 3. In other embodiments, the SMPS 400 may be implemented with only the second active clamp circuit 402 if no primary side clamp is needed.

Figure 5:
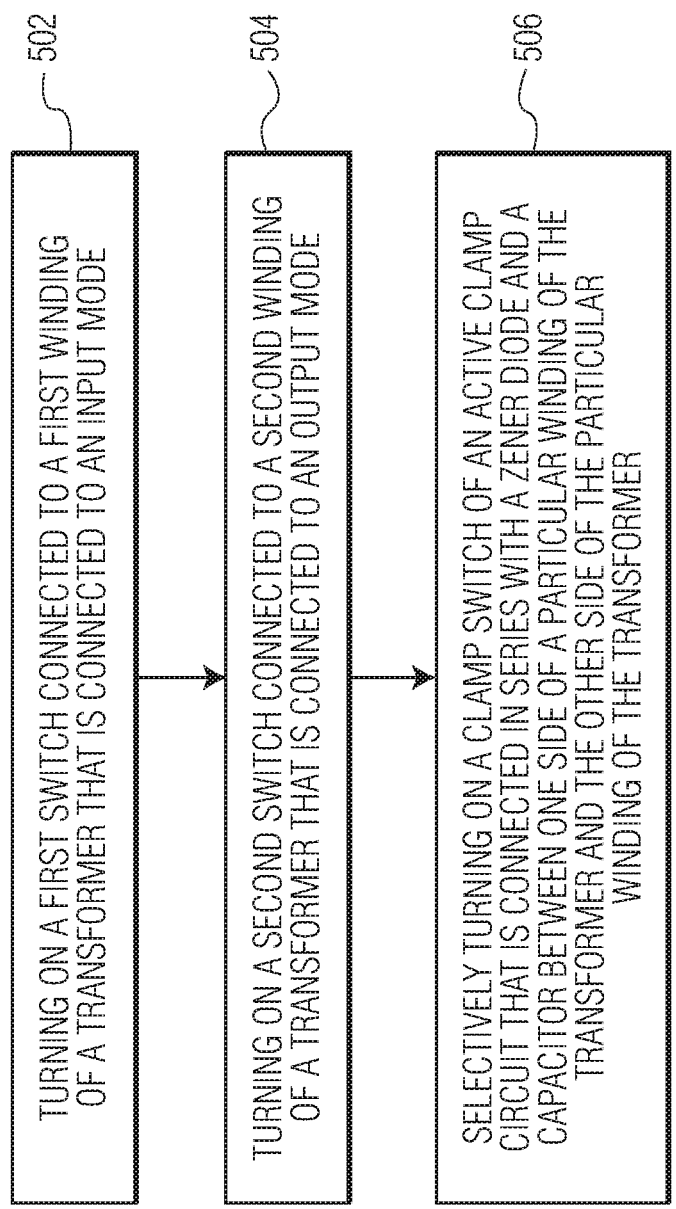
FIG. 5 is a process flow diagram of a method of operating a SMPS in accordance with an embodiment of the invention.

FIG. 5 is a process flow diagram of a method of operating an SMPS in accordance with an embodiment of the invention. At block 502, a first switch connected to a first winding of a transformer that is connected to an input node is turned on to store energy in the transformer. At block 504, a second switch connected to a second winding of the transformer that is connected to an output node is turned on to transfer the stored energy to the output node. At block 504, selectively turning on a clamp switch of an active clamp circuit that is connected in series with a Zener diode and a capacitor between one side of a particular winding of the transformer and the other side of the particular winding of the transformer is turned on. The particular winding is one of the first and second windings of the transformer.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more feature.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. A switched mode power supply (SMPS) comprising:
    a transformer with a first winding and a second winding, the first winding being connected to an input node and the second winding connected to an output node;
    an input switch connected to the first winding of the transformer;
    an output switch connected to the second winding of the transformer; and
    an active clamp circuit connected to the transformer, the active clamp circuit including:
        a clamp switch, a Zener diode and a clamp capacitor connected in series between one side of a particular winding of the transformer and another side of the particular winding of the transformer, the particular winding being one of the first and second windings of the transformer;
    wherein the Zener diode is connected between the clamp switch and the clamp capacitor.

2. The SMPS of claim 1,
    wherein the clamp switch is a transistor and
    wherein the active clamp circuit further includes a resistor and a diode,
        the resistor being connected to a control node of the transistor and the Zener diode,
        the diode being connected to the control node of the transistor and the clamp capacitor.

3. The SMPS of claim 2,
    wherein the clamp switch is a metal-oxide-semiconductor field-effect transistor (MOSFET).

4. The SMPS of claim 3,
    wherein the active clamp circuit further includes a second clamp capacitor connected in parallel with the resistor.

5. The SMPS of claim 1,
    wherein the active clamp circuit is connected to the first winding of the transformer and the input switch.

6. The SMPS of claim 5, further comprising
    a second active clamp circuit connected to the second winding of the transformer and the output switch,
    the second active clamp circuit including a second clamp switch, a second Zener diode and a second clamp capacitor connected in series between one side of the second winding of the transformer and the other side of the second winding of the transformer.

7. The SMPS of claim 1,
    wherein the active clamp circuit is connected to the second winding of the transformer and the output switch.

8. A method of operating a switched mode power supply (SMPS), the method comprising:
    turning on a first switch connected to a first winding of a transformer that is connected to an input node to store energy in the transformer;
    turning on a second switch connected to a second winding of the transformer that is connected to an output node to transfer the stored energy to the output node; and
    selectively turning on a clamp switch of an active clamp circuit that is connected in series with a Zener diode and a capacitor between one side of a particular winding of the transformer and another side of the particular winding of the transformer, the particular winding being one of the first and second windings of the transformer;

wherein the Zener diode is connected between the clamp switch and the clamp capacitor.

9. The method of claim 8, wherein the clamp switch is a transistor and wherein the active clamp circuit further includes a resistor and a diode, the resistor being connected to a control node of the transistor and the Zener diode, the diode being connected to the control node of the transistor and the clamp capacitor.

10. The method of claim 9, wherein the active clamp circuit further includes a second clamp capacitor connected in parallel with the resistor.

11. The method of claim 8, wherein selectively turning on the clamp switch includes selectively turning on the clamp switch of the active clamp circuit that is connected to the first winding of the transformer and the input switch.

12. The method of claim 11, further comprising selectively turning on a second clamp switch of a second active clamp circuit that is connected in series with a second Zener diode and a second capacitor between one side of the second winding of the transformer and the other side of the second winding of the transformer.

13. The method of claim 8, wherein selectively turning on the clamp switch includes selectively turning on the clamp switch of the active clamp circuit that is connected to the second winding of the transformer and the input switch.

14. A switched mode power supply (SNIPS) comprising:

a transformer with a primary winding and a secondary winding;

an input capacitor connected to an input power source and the primary winding of the transformer;

an input switch connected to the primary winding of the transformer;

an output capacitor connected to the secondary winding of the transformer;

an output switch connected to the secondary winding of the transformer; and an active clamp circuit connected to the transformer, the active clamp circuit including:

a clamp transistor switch, a Zener diode and a clamp capacitor connected in series between one side of a particular winding of the transformer and another side of the particular winding of the transformer, the particular winding being one of the primary and secondary windings of the transformer, and a resistor and a diode connected in parallel between a control terminal of the clamp transistor switch and the Zener diode.

15. The SNIPS of claim 14, wherein the Zener diode is connected between the clamp transistor switch and the clamp capacitor.

16. The SNIPS of claim 14, wherein the diode being connected to the control terminal of the clamp transistor switch and the clamp capacitor.

17. The SMPS of claim 16, wherein the active clamp circuit further includes a second clamp capacitor connected in parallel with the resistor.

18. The SMPS of claim 14, wherein the active clamp circuit is connected to the first winding of the transformer and the input switch, and further comprising a second active clamp circuit connected to the second winding of the transformer and the output switch, the second active clamp circuit including a second clamp switch, a second Zener diode and a second clamp capacitor connected in series between one side of the second winding of the transformer and the other side of the second winding of the transformer.

\* \* \* \* \*